No. 732,047. Patented June 30, 1903.

UNITED STATES PATENT OFFICE.

WILLIAM R. CHIPMAN, OF NEW YORK, N. Y.

ELECTRODE.

SPECIFICATION forming part of Letters Patent No. 732,047, dated June 30, 1903.

Application filed May 8, 1902. Serial No. 106,492. (No model.)

*To all whom it may concern:*

Be it known that I, WILLIAM R. CHIPMAN, a citizen of the United States, residing in New York city, in the county and State of New York, have invented a new and useful Improvement in Electrodes, of which the following is a description.

This invention relates to means for purifying liquids by electrolysis, and more particularly has reference to electrodes employed in a system of means to produce chemical decomposition.

The object of my invention is to provide an electrode which is efficient for the purpose, simple, cheap of production, and durable.

Therefore the invention consists in means, composition, and parts hereinafter described and claimed.

The particular composition of my electrode renders it especially useful as an anode, and when so used in an apparatus or in a system for purifying liquids is found to be very efficient and to produce excellent results—that is to say, its action in producing or developing oxyhydrates is found to be certain and rapid, and the oxyhydrates so developed are not noxious to health nor deleterious nor are they soluble in water, but form with the nitrogenous matters in solution or in suspension a coagulum which is easily and effectively filtered out, leaving the liquid pure, wholesome, and potable.

My electrode is composed of metallic aluminium, Straits tin, and nickel. The metallic aluminium is the oxyhydrate-developing element, the Straits tin is the binding element, and the nickel is the hardening element. Any other hardening metal may be employed in the composition, nickel being mentioned merely as an example of a good and effective element for the purpose in this particular composition.

The liquid to be treated or purified will obviously determine and control the proportion of the several elements of the composition, it having been found that different liquids can be best purified by different proportions of the above-mentioned ingredients. I have, however, determined upon a composition of the above ingredients which is particularly effective in the purification of water. Such composition is substantially as follows: aluminium, thirty-five to forty parts; Straits tin, fifty to forty-five parts, and nickel or other suitable hardening substance, fifteen parts. With these elements a suitable flux is used, the same consisting, preferably, of crude tartar and saltpeter in equal parts, green bottle-glass two parts, and calcium borax one part.

I wish it to be understood that I do not intend to be limited to the exact proportions of the elements or ingredients of my composition as above set forth nor to the particular flux mentioned, it being within the scope of my invention to vary or change the same accordingly as the results desired or the liquids to be treated may suggest or dictate. The flux suggested is specially designed to render the aluminium element of the composition completely fluid.

In place of the nickel as the hardening element I might use ferrosilicon, chromium, ferromanganese, or platinum.

In order to properly effect the compounding of the ingredients of my composition, the aluminium should be first reduced to a molten state. Then the hardener should be added and the flux employed to keep the mass fluid. When ready to manipulate the composition for the desired purpose, the Straits tin should be slowly added, the mass being kept well agitated. The compound thus formed will be found malleable and capable of being easily cast or rolled into the desired form or shape to be used as an anode in a given system.

For the cathode any suitable substance may be employed, the same being selected with reference to its properties for the transmission of the electric current.

It is to be noted that the Straits tin serves not only as a binder in my composition, but also is an effective aid in producing or developing oxyhydrates, and in the latter particular it becomes a substitute for more costly elements or substances for the same purpose—such, *e. g.*, as magnesium. This is an important fact to consider in connection with the simplicity and cheapness, as well as the effectiveness, of my electrode.

Having thus described my invention, what

I claim, and desire to secure by Letters Patent, is—

1. An electrode for use in the purification of liquids by electrolysis, consisting of nickel and a substance which acts as a producer of oxyhydrates and as a binder.

2. An electrode for use in the purification of liquids by electrolysis, consisting of Straits tin and nickel.

3. An electrode for use in the purification of liquids by electrolysis, consisting of aluminium, nickel and Straits tin.

Signed at New York, in the county of New York and State of New York, this 7th day of May, A. D. 1902.

WILLIAM R. CHIPMAN.

Witnesses:
MABEL B. HOAR,
C. McC. CHAPMAN.